US012607604B2

(12) United States Patent (10) Patent No.: US 12,607,604 B2

Saga et al. (45) Date of Patent: Apr. 21, 2026

(54) ULTRASONIC INSPECTION APPARATUS AND METHOD

(71) Applicant: Hitachi GE Vernova Nuclear Energy, Ltd., Ibaraki (JP)

(72) Inventors: Kaname Saga, Tokyo (JP); So Kitazawa, Tokyo (JP); Akihiko Hirano, Hitachi (JP); Yoshizumi Fukuhara, Hitachi (JP); Junta Yamada, Hitachi (JP)

(73) Assignee: Hitachi GE Vernova Nuclear Energy, Ltd ., Ibaraki (JP)

( * ) Notice: Subject to any disclaimer, the term of this patent is extended or adjusted under 35 U.S.C. 154(b) by 239 days.

(21) Appl. No.: 18/527,544

(22) Filed: Dec. 4, 2023

(65) Prior Publication Data

US 2024/0192175 A1 Jun. 13, 2024

(30) Foreign Application Priority Data

Dec. 8, 2022 (JP) ................................. 2022-196488

(51) Int. Cl.
  *G01N 29/07* (2006.01)
  *G01N 29/24* (2006.01)
(52) U.S. Cl.
  CPC ......... *G01N 29/07* (2013.01); *G01N 29/2437* (2013.01); *G01N 2291/02854* (2013.01)
(58) Field of Classification Search
  CPC .............. G01N 29/07; G01N 29/2437; G01N 2291/02854
  USPC ........................................................ 73/597
  See application file for complete search history.

(56) References Cited

U.S. PATENT DOCUMENTS

| 5,804,730 A * | 9/1998 | Pfannenstiel | ...... G01N 29/2487 |
| | | | 73/624 |
| 7,454,973 B2 * | 11/2008 | Baba | .................... G01N 29/449 |
| | | | 600/443 |
| 9,423,380 B2 * | 8/2016 | Mizota | ................. G01N 29/069 |

FOREIGN PATENT DOCUMENTS

| JP | 2010-190794 A | | 9/2010 |
| JP | 2011027571 | * | 2/2011 |
| JP | 2020-091145 A | | 6/2020 |

OTHER PUBLICATIONS

Japanese Office Action received in corresponding Japanese Application No. 2022-196488 dated Feb. 10, 2026.

* cited by examiner

*Primary Examiner* — Jacques M Saint Surin
(74) *Attorney, Agent, or Firm* — MATTINGLY & MALUR, PC

(57) ABSTRACT

An ultrasonic inspection apparatus includes a control device 12 that outputs a pulse signal for making an ultrasonic probe 11A transmit an ultrasonic wave to the ultrasonic probe 11A and that is supplied with a waveform signal obtained by converting the received ultrasonic wave from an ultrasonic probe 11B, and that computes a thickness reduction depth of a pipe 1 between the ultrasonic probe 11A and the ultrasonic probe 11B. The control device 12 computes the thickness reduction depth of the pipe 1 by selectively using a reception time of the ultrasonic wave transmitted from the ultrasonic probe 11A, reflected once by an inner surface 3 of the pipe 1, and received by the ultrasonic probe 11B, and a reception time of the ultrasonic wave transmitted from the ultrasonic probe 11A, reflected twice by the inner surface 3 of the pipe 1, and received by the ultrasonic probe 11B.

7 Claims, 5 Drawing Sheets

FIG. 3

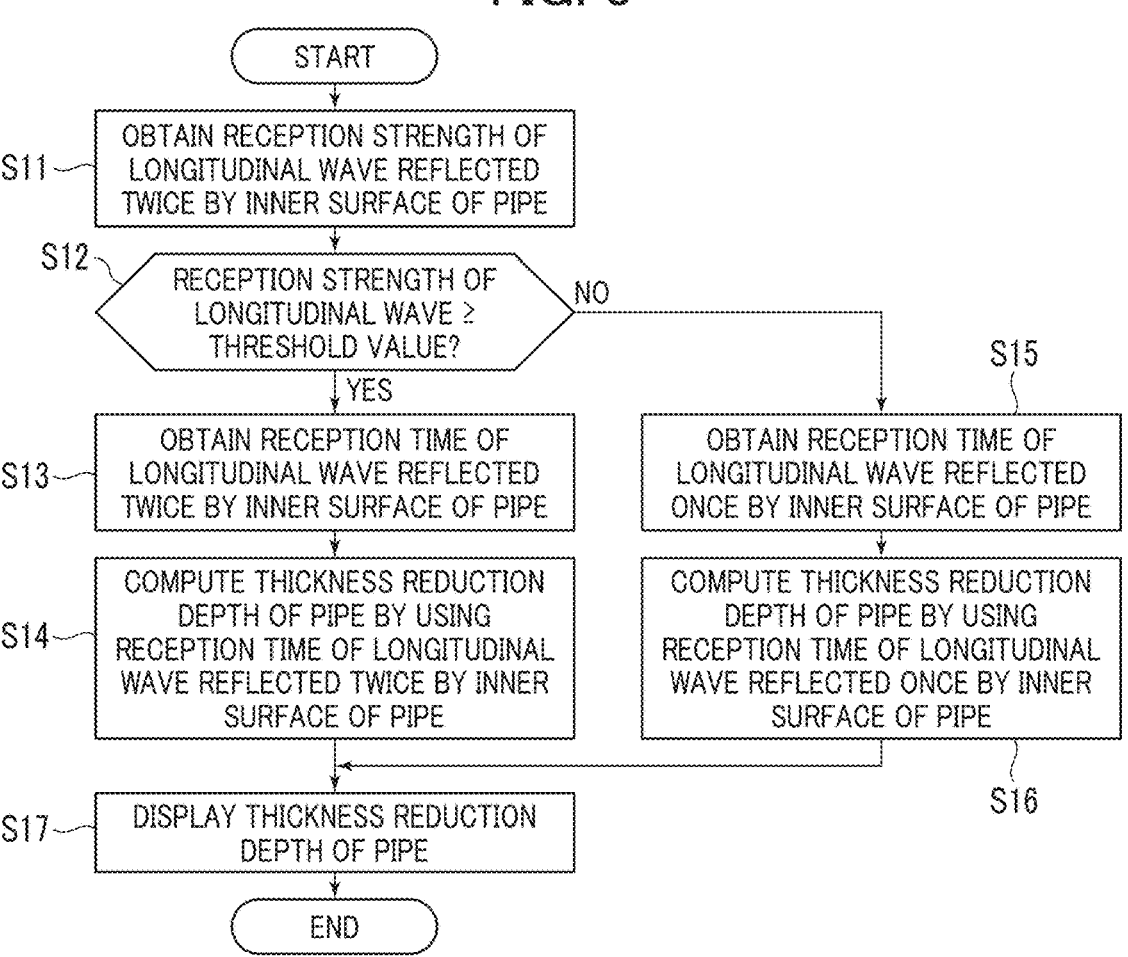

START

S11 — OBTAIN RECEPTION STRENGTH OF LONGITUDINAL WAVE REFLECTED TWICE BY INNER SURFACE OF PIPE

S12 — RECEPTION STRENGTH OF LONGITUDINAL WAVE ≥ THRESHOLD VALUE?

NO

YES

S13 — OBTAIN RECEPTION TIME OF LONGITUDINAL WAVE REFLECTED TWICE BY INNER SURFACE OF PIPE

S15 — OBTAIN RECEPTION TIME OF LONGITUDINAL WAVE REFLECTED ONCE BY INNER SURFACE OF PIPE

S14 — COMPUTE THICKNESS REDUCTION DEPTH OF PIPE BY USING RECEPTION TIME OF LONGITUDINAL WAVE REFLECTED TWICE BY INNER SURFACE OF PIPE

COMPUTE THICKNESS REDUCTION DEPTH OF PIPE BY USING RECEPTION TIME OF LONGITUDINAL WAVE REFLECTED ONCE BY INNER SURFACE OF PIPE

S16

S17 — DISPLAY THICKNESS REDUCTION DEPTH OF PIPE

END

FIG. 4

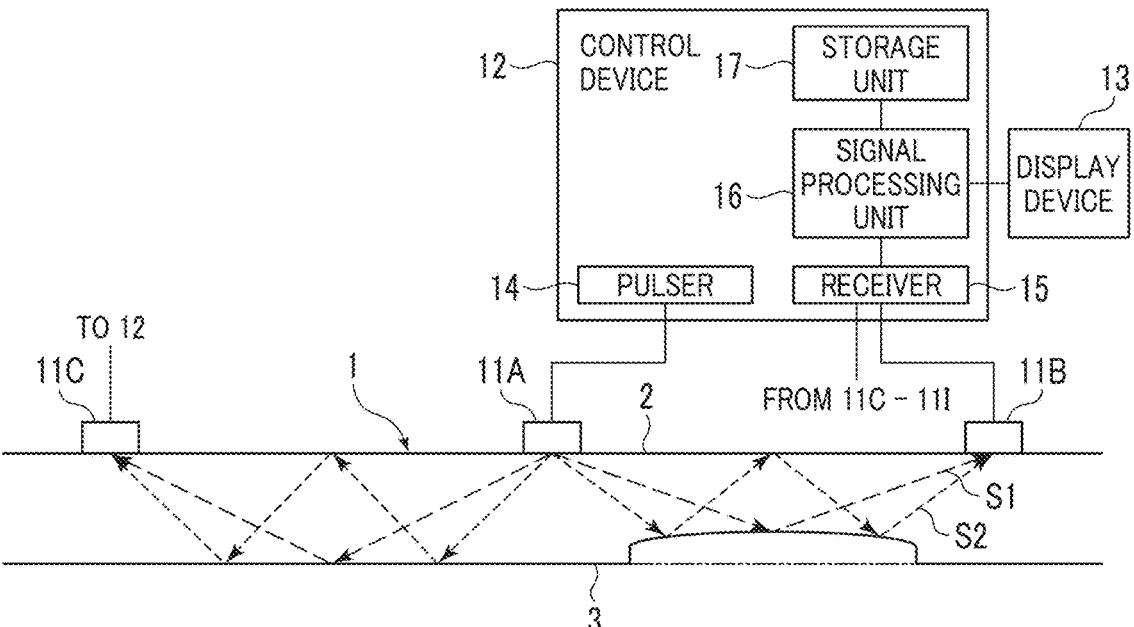

CONTROL DEVICE 12

17 — STORAGE UNIT

16 — SIGNAL PROCESSING UNIT

13 — DISPLAY DEVICE

14 — PULSER

15 — RECEIVER

TO 12

11C

1

11A

2

FROM 11C – 11I

11B

S1

S2

3

ULTRASONIC INSPECTION APPARATUS AND METHOD

CROSS-REFERENCE TO RELATED APPLICATION

The present application claims priority from Japanese application JP2022-196488, filed on Dec. 8, 2022, the content of which is hereby incorporated by reference into this application.

BACKGROUND OF THE INVENTION

1. Field of the Invention

The present invention relates to an ultrasonic inspection apparatus and a method for measuring a thickness reduction depth of an inspection object.

2. Description of the Related Art

For some reason, a thickness reduction may occur in a pipe used in a nuclear power plant, a thermal power plant, a chemical plant, or the like. Therefore, an inspection for measuring the thickness or a thickness reduction depth, in other words, a difference between the thickness at a time of a sound state and the thickness at a time of a measurement, of the pipe is performed by use of, for example, an ultrasonic inspection apparatus.

An ultrasonic inspection apparatus according to Patent Document 1 includes: an ultrasonic probe for transmission and an ultrasonic probe for reception, the ultrasonic probes being arranged on the outer surface of a pipe and separated from each other; and a control device. The control device outputs a driving signal to the ultrasonic probe for transmission to make an ultrasonic wave transmitted from the ultrasonic probe for transmission to the inside of the pipe. The ultrasonic probe for reception receives the ultrasonic wave reflected by the inner surface of the pipe, converts the ultrasonic wave into a waveform signal, and outputs the waveform signal to the control device.

The control device computes the thickness of the pipe at an intermediate position between the ultrasonic probe for transmission and the ultrasonic probe for reception by using a reception time, in other words, a propagation time, of the ultrasonic wave transmitted from the ultrasonic probe for transmission, reflected twice by the inner surface of the pipe, and received by the ultrasonic probe for reception. Thus, even when a thickness reduction occurs on the outer surface side of the pipe at the intermediate position between the ultrasonic probe for transmission and the ultrasonic probe for reception, the thickness at the position can be measured.

PRIOR ART DOCUMENT

Patent Document
Patent Document 1: JP-2020-091145-A

SUMMARY OF THE INVENTION

In Patent Document 1, assuming a case where a thickness reduction occurs on the outer surface side of the pipe due to contact between the pipe and an opposing object, by use of the reception time of the ultrasonic wave transmitted from the ultrasonic probe for transmission, reflected twice by the inner surface of the pipe, and received by the ultrasonic probe for reception, it is possible to measure the thickness of the pipe between the ultrasonic probe for transmission and the ultrasonic probe for reception.

Though not described in Patent Document 1, assuming a case where a thickness reduction occurs on the inner surface side of the pipe due to an effect of a fluid within the pipe, by use of the reception time of the ultrasonic wave transmitted from the ultrasonic probe for transmission, reflected twice by the inner surface of the pipe, and received by the ultrasonic probe for reception, it is also possible to measure the thickness or thickness reduction depth of the pipe between the ultrasonic probe for transmission and the ultrasonic probe for reception.

In this case, as compared with a case of using the reception time of the ultrasonic wave transmitted from the ultrasonic probe for transmission, reflected once by the inner surface of the pipe, and received by the ultrasonic probe for reception, an amount of change in the reception time of the ultrasonic wave due to the thickness reduction depth of the pipe is increased, and therefore, a relatively small thickness reduction depth can be measured. However, when the amount of change in the reception time of the ultrasonic wave due to the thickness reduction depth of the pipe is increased too much, it becomes difficult to extract the reception time of the ultrasonic wave, and therefore, it becomes difficult to measure a relatively large thickness reduction depth. Hence, a measurable range of the thickness reduction depth of the pipe is limited.

It is an object of the present invention to provide an ultrasonic inspection apparatus and a method that can expand the measurable range of the thickness reduction depth of an inspection object.

In order to achieve the above object, according to a representative aspect of the present invention, there is provided an ultrasonic inspection apparatus including: a first ultrasonic probe that is disposed on an outer surface of an inspection object, and transmits an ultrasonic wave to an inside of the inspection object; a second ultrasonic probe that is disposed on the outer surface of the inspection object so as to be separated from the first ultrasonic probe, and receives the ultrasonic wave reflected by an inner surface of the inspection object; a control device that is configured to output a pulse signal for making the first ultrasonic probe transmit the ultrasonic wave to the first ultrasonic probe, that is supplied with a waveform signal obtained by converting the received ultrasonic wave from the second ultrasonic probe, and that is configured to compute a thickness reduction depth of the inspection object between the first ultrasonic probe and the second ultrasonic probe; and a display device that displays the thickness reduction depth of the inspection object computed by the control device, in which the control device is configured to compute the thickness reduction depth of the inspection object between the first ultrasonic probe and the second ultrasonic probe by selectively using a reception time of the ultrasonic wave transmitted from the first ultrasonic probe, reflected once by the inner surface of the inspection object, and received by the second ultrasonic probe, and a reception time of the ultrasonic wave transmitted from the first ultrasonic probe, reflected twice by the inner surface of the inspection object, and received by the second ultrasonic probe.

According to the present invention, it is possible to expand a measurable range of the thickness reduction depth of the inspection object.

BRIEF DESCRIPTION OF THE DRAWINGS

FIG. 3 is a diagram illustrating processing contents of a control device in the one embodiment of the present invention;

FIG. 4 is a schematic diagram illustrating a configuration of an ultrasonic inspection apparatus in a first modification of the present invention, together with a part of an axial section of the pipe;

DESCRIPTION OF THE PREFERRED EMBODIMENTS

One embodiment of the present invention will be described with reference to the drawings.

Figure 1:
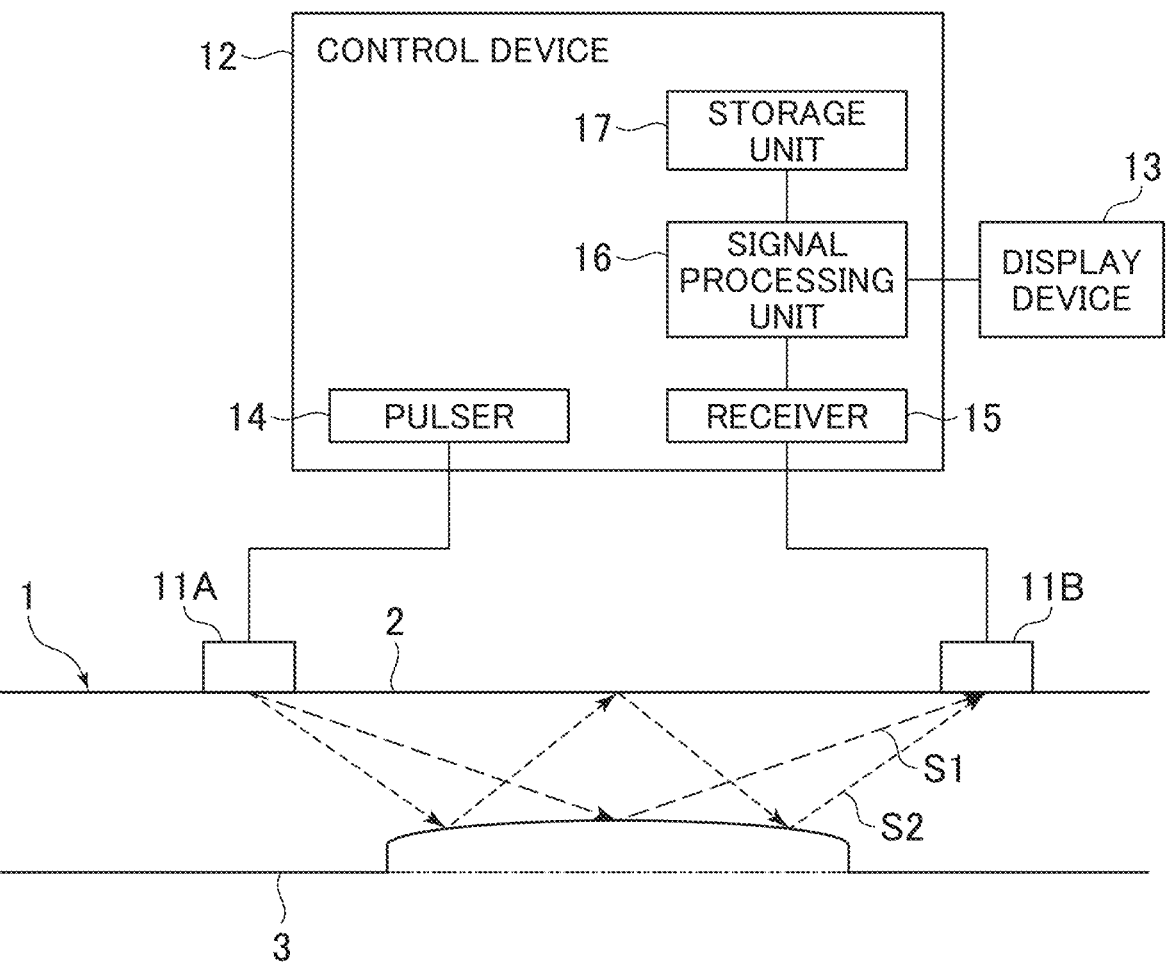
FIG. 1 is a schematic diagram illustrating a configuration of an ultrasonic inspection apparatus in one embodiment of the present invention, together with a part of an axial section of a pipe.

FIG. 1 is a schematic diagram illustrating a configuration of an ultrasonic inspection apparatus in the present embodiment, together with a part of an axial section of a pipe.

The ultrasonic inspection apparatus according to the present embodiment includes: an ultrasonic probe 11A that is disposed on an outer surface 2 of a pipe 1 or an inspection object, and transmits an ultrasonic wave to the inside of the pipe 1; an ultrasonic probe 11B that is, for example, disposed on the outer surface 2 of the pipe 1 so as to be separated from the ultrasonic probe 11A in the axial direction of the pipe 1 or in a left-right direction of FIG. 1, and receives the ultrasonic wave reflected by an inner surface 3 of the pipe 1; a control device 12; and a display device 13. In the present embodiment, the arrangement of the ultrasonic probes 11A and 11B on the outer surface 2 of the pipe 1 can be changed.

The ultrasonic probes 11A or 11B is, for example, an angle probe whose sound axis is inclined with respect to the outer surface 2 of the pipe 1 or a normal probe whose sound axis is perpendicular to the outer surface 2 of the pipe 1 but whose directivity angle is large. The control device 12 includes a pulser 14, a receiver 15, a signal processing unit 16, and a storage unit 17. The signal processing unit 16 is constituted by a processor that performs processing according to a program or the like. The storage unit 17 is constituted by a hard disk, a memory, and the like. The display device 13 is a display or the like.

The pulser 14 of the control device 12 outputs, to the ultrasonic probe 11A, a pulse signal or a driving signal for making the ultrasonic probe 11A transmit the ultrasonic wave. A piezoelectric element, not illustrated, of the ultrasonic probe 11A vibrates according to the pulse signal, and transmits the ultrasonic wave to the inside of the pipe 1. The ultrasonic wave is reflected once by the inner surface 3 of the pipe 1, and is received by the ultrasonic probe 11B, that is, propagated in a path S1 from the ultrasonic probe 11A to the inner surface 3 of the pipe 1, and to the ultrasonic probe 11B. In addition, the ultrasonic wave is reflected twice by the inner surface 3 of the pipe 1, and is received by the ultrasonic probe 11B, that is, propagated in a path S2 from the ultrasonic probe 11A to the inner surface 3 of the pipe 1, to the outer surface 2 of the pipe 1, to the inner surface 3 of the pipe 1, and to the ultrasonic probe 11B. Incidentally, the ultrasonic wave includes a longitudinal wave and a transverse wave slower than the longitudinal wave.

A piezoelectric element, not illustrated, of the ultrasonic probe 11B receives the longitudinal wave reflected once by the inner surface 3 of the pipe 1, the transverse wave reflected once by the inner surface 3 of the pipe 1, the longitudinal wave reflected twice by the inner surface 3 of the pipe 1, and the transverse wave reflected twice by the inner surface 3 of the pipe 1, converts these waves into waveform signals or electric signals, and outputs the waveform signals to the control device 12. The receiver 15 of the control device 12 is supplied with the waveform signals from the ultrasonic probe 11B. The signal processing unit 16 digitizes the waveform signals from the ultrasonic probe 11B into waveform data, and stores the waveform data in the storage unit 17. The waveform data is constituted by combinations of reception times and reception strengths or amplitudes of the ultrasonic waves.

Figure 2A:
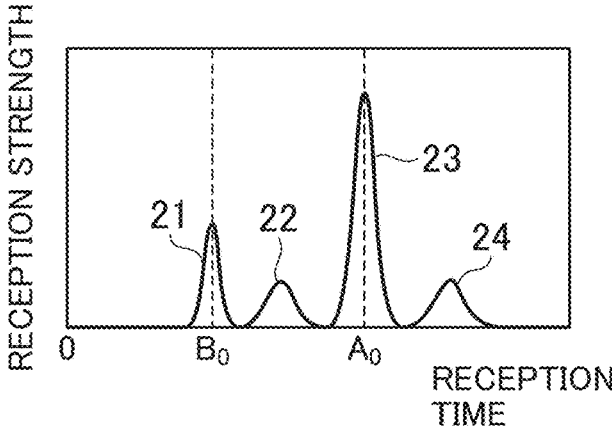
FIGS. 2A to 2C are diagrams illustrating specific examples of waveform data in the one embodiment of the present invention.
Figure 2B:
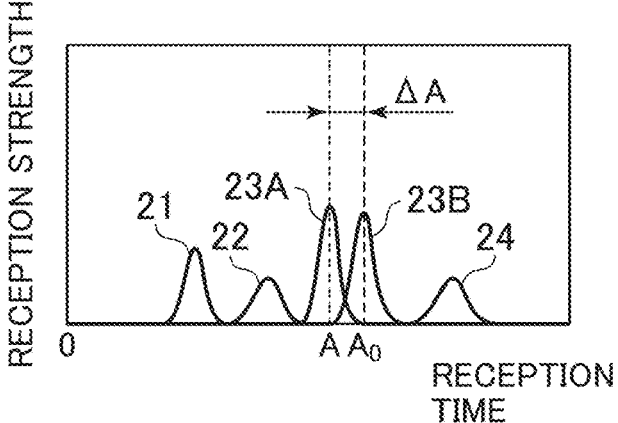
Figure 2C:
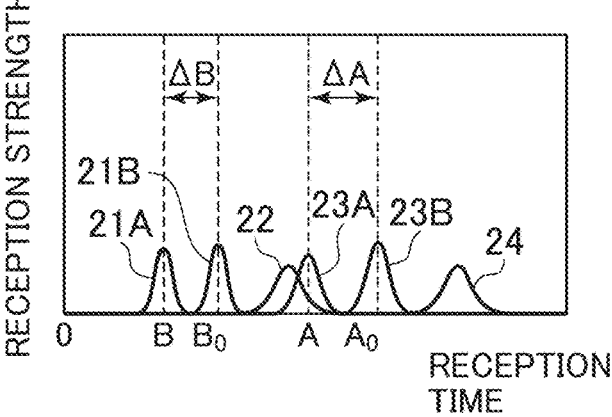

FIG. 2A is a diagram illustrating a specific example of the waveform data in a case where the thickness reduction depth of the pipe 1 is zero, in other words, at a time of a sound state. FIG. 2B is a diagram illustrating a specific example of the waveform data in a case where the thickness reduction depth of the pipe 1 is relatively small. FIG. 2C is a diagram illustrating a specific example of the waveform data in a case where the thickness reduction depth of the pipe 1 is relatively large. Incidentally, in FIG. 2B and FIG. 2C, a case where a reduced thickness portion and a sound portion are present in the circumferential direction of the pipe 1 is taken as an example.

The waveform data illustrated in FIG. 2A includes the data on a longitudinal wave 21 reflected once by the inner surface 3 of the sound portion of the pipe 1, the data on a transverse wave 22 reflected once by the inner surface 3 of the sound portion of the pipe 1, the data on a longitudinal wave 23 reflected twice by the inner surface 3 of the sound portion of the pipe 1, and the data on a transverse wave 24 reflected twice by the inner surface 3 of the sound portion of the pipe 1.

The waveform data illustrated in FIG. 2B includes the data on a longitudinal wave 21 reflected once by the inner surface 3 of the reduced thickness portion or the sound portion of the pipe 1, the data on a transverse wave 22 reflected once by the inner surface 3 of the reduced thickness portion or the sound portion of the pipe 1, the data on a longitudinal wave 23A reflected twice by the inner surface 3 of the reduced thickness portion of the pipe 1, the data on a longitudinal wave 23B reflected twice by the inner surface 3 of the sound portion of the pipe 1, and the data on a transverse wave 24 reflected twice by the inner surface 3 of the reduced thickness portion or the sound portion of the pipe 1.

The waveform data illustrated in FIG. 2C includes the data on a longitudinal wave 21A reflected once by the inner surface 3 of the reduced thickness portion of the pipe 1, the data on a longitudinal wave 21B reflected once by the inner surface 3 of the sound portion of the pipe 1, the data on a transverse wave 22 reflected once by the inner surface 3 of the reduced thickness portion or the sound portion of the pipe 1, the data on a longitudinal wave 23A reflected twice by the inner surface 3 of the reduced thickness portion of the pipe 1, the data on a longitudinal wave 23B reflected twice by the inner surface 3 of the sound portion of the pipe 1, and the data on a transverse wave 24 reflected twice by the inner surface 3 of the reduced thickness portion or the sound portion of the pipe 1.

The signal processing unit 16 of the control device 12 computes the thickness reduction depth of the pipe 1 between the ultrasonic probe 11A and the ultrasonic probe 11B by use of the above-described waveform data. Details thereof will be described with reference to FIG. 3.

FIG. 3 is a flowchart illustrating processing contents of the control device 12 in the present embodiment.

In step S11, the signal processing unit 16 of the control device 12 obtains the reception strength of the longitudinal wave transmitted from the ultrasonic probe 11A, reflected twice by the inner surface 3 of the pipe 1, and received by the ultrasonic probe 11B, on the basis of the waveform data stored in the storage unit 17. Specifically, a local maximum value of the reception strengths of ultrasonic waves is extracted in a first range set in advance for the reception times of ultrasonic waves, specifically, a range of the reception times of longitudinal waves which range is assumed in consideration of changes in the thickness reduction depth of the pipe 1. Then, when one local maximum value of the reception strengths of ultrasonic waves is extracted (see FIG. 2A), the local maximum value is regarded as the reception strength of the longitudinal wave. When a plurality of local maximum values of the reception strengths of ultrasonic waves are extracted (see FIG. 2B or FIG. 2C), on the other hand, a reception strength local maximum value corresponding to a shortest reception time among reception times corresponding to these local maximum values is selected and is regarded as the reception strength of the longitudinal wave.

The processing proceeds to step S12, where the signal processing unit 16 of the control device 12 determines whether the reception strength of the longitudinal wave which is obtained in step S11 is equal to or more than a predetermined threshold value. When the reception strength of the longitudinal wave which is obtained in step S11 is equal to or more than the predetermined threshold value, the processing proceeds to step S13. In step S13, the signal processing unit 16 of the control device 12 obtains a reception time A, in other words, a propagation time, of the longitudinal wave transmitted from the ultrasonic probe 11A, reflected twice by the inner surface 3 of the pipe 1, and received by the ultrasonic probe 11B, on the basis of the waveform data stored in the storage unit 17. Specifically, the reception time A of the longitudinal wave corresponding to the reception strength of the longitudinal wave which is obtained in step S11 is obtained.

The processing thereafter proceeds to step S14, where the signal processing unit 16 of the control device 12 computes the thickness reduction depth of the pipe 1 between the ultrasonic probes 11A and 11B by use of the reception time A of the longitudinal wave which is obtained in S13. Specifically, the storage unit 17 of the control device 12 stores in advance a reception time $A_0$ of the longitudinal wave transmitted from the ultrasonic probe 11A, reflected twice by the inner surface 3 of the sound portion of the pipe 1, and received by the ultrasonic probe 11B. The signal processing unit 16 of the control device 12 computes a difference $\Delta A$ between the reception time A of the longitudinal wave obtained in step S13, and the reception time $A_0$ of the longitudinal wave stored in the storage unit 17. A product of the difference $\Delta A$ and a speed of sound substantially corresponds to twice the thickness reduction depth of the pipe 1. Therefore, the thickness reduction depth of the pipe 1 is computed on the basis of the difference $\Delta A$.

When the reception strength of the longitudinal wave which is obtained in step S11 is less than the predetermined threshold value, the processing proceeds to step S15. In step S15, the signal processing unit 16 of the control device 12 obtains a reception time B, in other words, a propagation time, of the longitudinal wave transmitted from the ultrasonic probe 11A, reflected once by the inner surface 3 of the pipe 1, and received by the ultrasonic probe 11B, on the basis of the waveform data stored in the storage unit 17. Specifically, a local maximum value of the reception strengths of ultrasonic waves is extracted in a second range set in advance for the reception times of ultrasonic waves, specifically, an assumed range of the reception times of longitudinal waves in consideration of changes in the thickness reduction depth of the pipe 1. Then, when one local maximum value of the reception strengths of waveform signals is extracted (see FIG. 2A or FIG. 2B), the local maximum value is regarded as the reception strength of the longitudinal wave. When a plurality of local maximum values of the reception strengths of ultrasonic waves are extracted (see FIG. 2C), on the other hand, a reception strength local maximum value corresponding to a shortest reception time among reception times corresponding to these local maximum values is selected and is regarded as the reception strength of the longitudinal wave. Then, the reception time B of the longitudinal wave corresponding to the above-described reception strength of the longitudinal wave is obtained.

The processing thereafter proceeds to step S16, where the signal processing unit 16 of the control device 12 computes the thickness reduction depth of the pipe 1 between the ultrasonic probes 11A and 11B by use of the reception time B of the longitudinal wave which is obtained in S15. Specifically, the storage unit 17 of the control device 12 stores in advance a reception time $B_0$ of the longitudinal wave transmitted from the ultrasonic probe 11A, reflected once by the inner surface 3 of the sound portion of the pipe 1, and received by the ultrasonic probe 11B. The signal processing unit 16 of the control device 12 computes a difference $\Delta B$ between the reception time B of the longitudinal wave obtained in step S15, and the reception time $B_0$ of the longitudinal wave stored in the storage unit 17. A product of the difference $\Delta B$ and a speed of sound substantially corresponds to the thickness reduction depth of the pipe 1. Therefore, the thickness reduction depth of the pipe 1 is computed on the basis of the difference $\Delta B$.

After ending step S14 or S16, the processing proceeds to step S17, where the signal processing unit 16 of the control device 12 stores the computed thickness reduction depth of the pipe 1 in the storage unit 17, and displays the computed thickness reduction depth on the display device 13.

As described above, in the present embodiment, the thickness reduction depth of the pipe 1 between the ultrasonic probes 11A and 11B is computed by selectively use of the reception time of the ultrasonic wave transmitted from the ultrasonic probe 11A, reflected once by the inner surface 3 of the pipe 1, and received by the ultrasonic probe 11B, and the reception time of the ultrasonic wave transmitted from the ultrasonic probe 11A, reflected twice by the inner surface 3 of the pipe 1, and received by the ultrasonic probe 11B. A relatively small thickness reduction depth, for example, 0.5 to 3 mm, can be measured when the reception time of the ultrasonic wave transmitted from the ultrasonic probe 11A, reflected twice by the inner surface 3 of the pipe 1, and received by the ultrasonic probe 11B is used. However, as illustrated in FIG. 2C, for example, it is difficult to measure a relatively large thickness reduction depth for a reason that, for example, the data on the transverse wave 22 reflected once by the inner surface 3 of the reduced thickness portion or the sound portion of the pipe 1 and the data on the longitudinal wave 23A reflected twice by the inner surface 3 of the reduced thickness portion of the pipe 1 overlap each other. On the other hand, a relatively large thickness reduction depth, for example, 1 to 6 mm, can be measured when the reception time of the ultrasonic wave transmitted from the ultrasonic probe 11A, reflected once by the inner surface 3 of the pipe 1, and received by the ultrasonic probe 11B is used. Hence, a measurable range of the thickness reduction depth of the pipe 1 can be expanded.

Incidentally, in the foregoing one embodiment, description has been made by taking as an example a case where the control device 12 obtains the reception strength of the longitudinal wave transmitted from the ultrasonic probe 11A, reflected twice by the inner surface 3 of the pipe 1, and received by the ultrasonic probe 11B, and computes the thickness reduction depth of the pipe 1 by selectively using, according to the reception strength of the longitudinal wave, the reception time A of the longitudinal wave transmitted from the ultrasonic probe 11A, reflected twice by the inner surface 3 of the pipe 1, and received by the ultrasonic probe 11B and the reception time B of the longitudinal wave transmitted from the ultrasonic probe 11A, reflected once by the inner surface 3 of the pipe 1, and received by the ultrasonic probe 11B. However, the embodiment is no limited to this example. The signal processing unit 16 of the control device 12 may compute the thickness reduction depth of the pipe 1 by selectively using the reception time A of the longitudinal wave and the reception time B of the longitudinal wave according to the difference between the obtained reception time A of the longitudinal wave and the reception time $A_0$ of the longitudinal wave stored in the storage unit 17.

Specifically, when the difference between the obtained reception time A of the longitudinal wave and the reception time $A_0$ of the longitudinal wave, the reception time $A_0$ being stored in the storage unit 17, is equal to or less than a predetermined threshold value, the thickness reduction depth of the pipe 1 is computed by use of the reception time A of the longitudinal wave. When the difference between the obtained reception time A of the longitudinal wave and the reception time $A_0$ of the longitudinal wave stored in the storage unit 17 exceeds the predetermined threshold value, on the other hand, the thickness reduction depth of the pipe 1 is computed by use of the reception time B of the longitudinal wave. Effects similar to those of the foregoing one embodiment can be obtained also in such a modification.

In addition, in the foregoing one embodiment, description has been made by taking as an example a case where the control device 12 computes the thickness reduction depth that is a first value of the pipe 1 between the ultrasonic probe 11A and the ultrasonic probe 11B by use of the reception time of the ultrasonic wave transmitted from the ultrasonic probe 11A and received by the ultrasonic probe 11B. However, the embodiment is not limited to this example. The control device 12 may output the pulse signal to the ultrasonic probe 11B to make the ultrasonic probe 11B transmit the ultrasonic wave to the inside of the pipe 1, and make the ultrasonic probe 11A receive the ultrasonic wave reflected by the inner surface 3 of the pipe 1. Then, it may input a waveform signal obtained by converting the received ultrasonic wave from the ultrasonic probe 11A. Then, it may compute the thickness reduction depth that is a second value of the pipe 1 between the ultrasonic probe 11A and the ultrasonic probe 11B by use of the reception time of the ultrasonic wave transmitted from the ultrasonic probe 11B and received by the ultrasonic probe 11A. Then, it may select a maximum of the first value and the second value, for example, as the thickness reduction depth or the true value of the pipe 1 between the ultrasonic probe 11A and the ultrasonic probe 11B.

In addition, in the foregoing one embodiment, description has been made by taking as an example a case where the ultrasonic inspection apparatus has the two ultrasonic probes 11A and 11B whose arrangement can be changed on the outer surface 2 of the pipe 1. However, the embodiment is not limited to this example. The ultrasonic inspection apparatus may have three or more ultrasonic probes fixed to the outer surface 2 of the pipe 1. A first modification of the present invention will be described with reference to FIG. 4 and FIG. 5.

Figure 5:
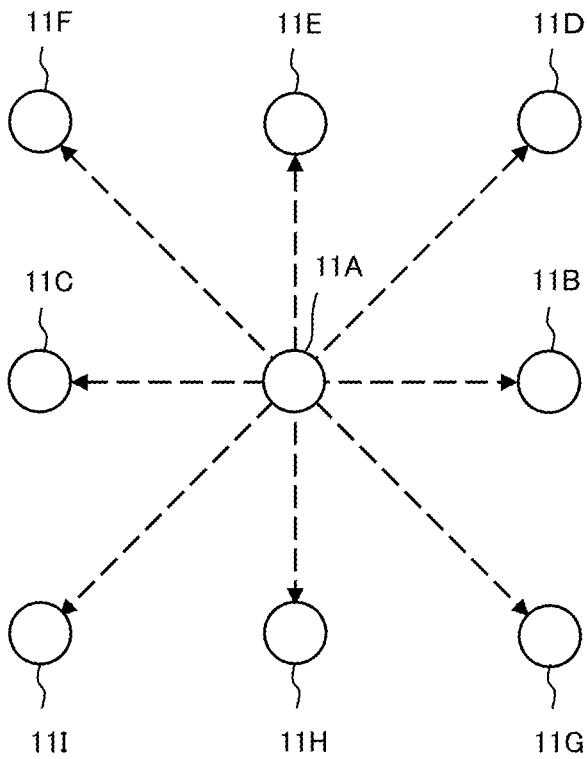
FIG. 5 is a developed view of the outer surface of the pipe, the developed view illustrating an arrangement of probes in the first modification of the present invention.

FIG. 4 is a schematic diagram illustrating a configuration of the ultrasonic inspection apparatus in the present modification, together with a part of an axial section of the pipe. FIG. 5 is a developed view of the outer surface of the pipe, the developed view illustrating an arrangement of ultrasonic probes in the present modification. Incidentally, in the present modification, parts equivalent to those of the foregoing one embodiment are identified by the same reference characters, and description thereof will be omitted as appropriate.

The ultrasonic inspection apparatus according to the present modification has ultrasonic probes 11A to 11I. The ultrasonic probes 11A to 11I are arranged and fixed at predetermined intervals in the axial direction of the pipe 1 or in a left-right direction of FIG. 4 and FIG. 5 and at predetermined intervals in the circumferential direction of the pipe 1 or in an upward-downward direction of FIG. 5. Each of the ultrasonic probes 11A to 11I is, for example, a normal probe whose sound axis is perpendicular to the outer surface 2 of the pipe 1 but whose directivity angle is large.

The pulser 14 of the control device 12 outputs a pulse signal to the ultrasonic probe 11A. The piezoelectric element of the ultrasonic probe 11A vibrates according to the pulse signal, and transmits an ultrasonic wave to the inside of the pipe 1. The ultrasonic wave is reflected once by the inner surface 3 of the pipe 1, and is received by the ultrasonic probes 11B to 11I. In addition, the ultrasonic wave is reflected twice by the inner surface 3 of the pipe 1, and is received by the ultrasonic probes 11B to 11I.

The piezoelectric elements of the ultrasonic probes 11B to 11I receive the longitudinal wave reflected once by the inner surface 3 of the pipe 1, the transverse wave reflected once by the inner surface 3 of the pipe 1, the longitudinal wave reflected twice by the inner surface 3 of the pipe 1, and the transverse wave reflected twice by the inner surface 3 of the pipe 1, convert these waves into waveform signals, and output the waveform signals to the control device 12. The receiver 15 of the control device 12 is supplied with the waveform signals from the ultrasonic probes 11B to 11I. The signal processing unit 16 digitizes the waveform signals from the ultrasonic probes 11B to 11I into waveform data, and stores the waveform data in the storage unit 17.

As in the foregoing one embodiment, the signal processing unit 16 of the control device 12 computes the thickness reduction depth of the pipe 1 between the ultrasonic probe 11A and the ultrasonic probe 11B by using the waveform data on the ultrasonic probe 11B. Similarly, it computes the thickness reduction depth of the pipe 1 between the ultrasonic probe 11A and the ultrasonic probe 11C by using of the waveform data on the ultrasonic probe 11C. Similarly, it computes the thickness reduction depth of the pipe 1 between the ultrasonic probe 11A and the ultrasonic probe 11D by using of the waveform data on the ultrasonic probe 11D. Similarly, it computes the thickness reduction depth of the pipe 1 between the ultrasonic probe 11A and the ultrasonic probe 11E by using of the waveform data on the ultrasonic probe 11E. Similarly, it computes the thickness reduction depth of the pipe 1 between the ultrasonic probe 11A and the ultrasonic probe 11F by using of the waveform data on the ultrasonic probe 11F.

Similarly, it computes the thickness reduction depth of the pipe 1 between the ultrasonic probe 11A and the ultrasonic probe 11G by using of the waveform data on the ultrasonic probe 11G. Similarly, it computes the thickness reduction depth of the pipe 1 between the ultrasonic probe 11A and the ultrasonic probe 11H by using of the waveform data on the ultrasonic probe 11H. Similarly, it computes the thickness reduction depth of the pipe 1 between the ultrasonic probe 11A and the ultrasonic probe 11I by using of the waveform data on the ultrasonic probe 11I.

The present modification can also provide effects similar to those of the foregoing one embodiment.

Incidentally, in the foregoing first modification, description has been made by taking as an example a case where the ultrasonic probes 11A to 11I and the control device 12 are connected to each other by cables. However, the first modification is not limited to this example. A second modification of the present invention will be described with reference to FIG. 6.

Figure 6:
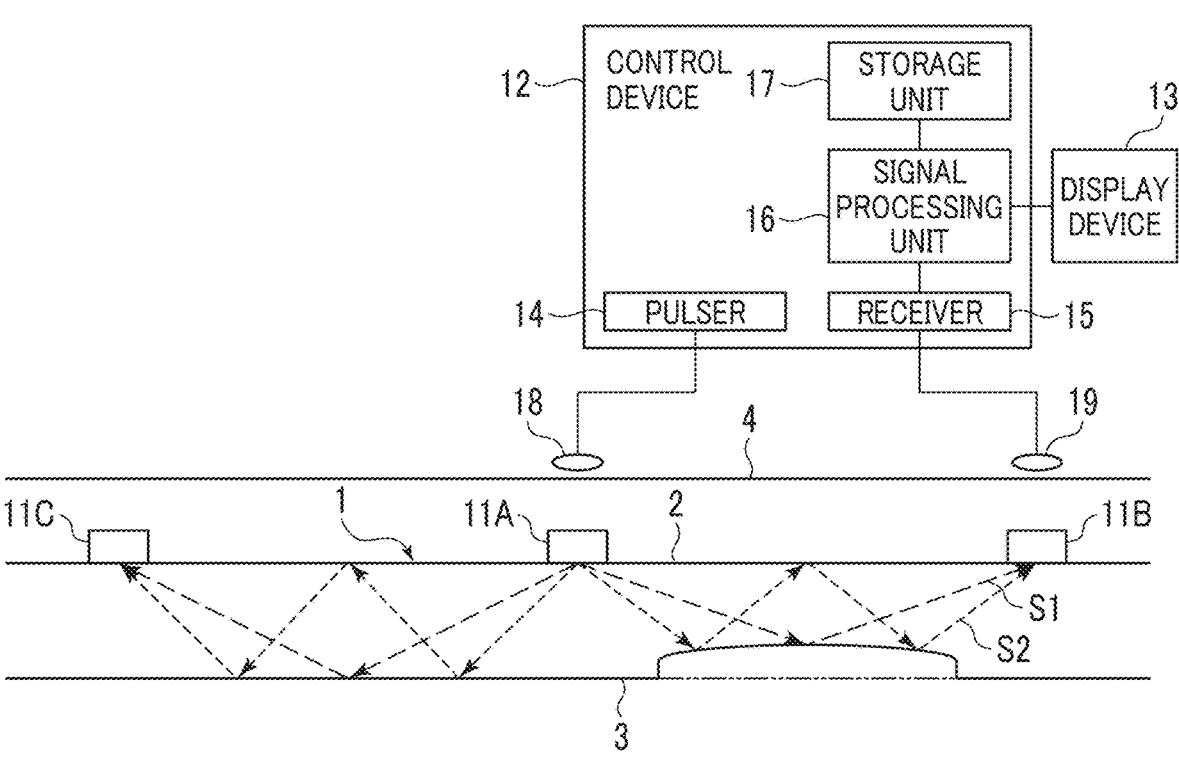
FIG. 6 is a schematic diagram illustrating a configuration of an ultrasonic inspection apparatus in a second modification of the present invention, together with a part of an axial section of the pipe.

FIG. 6 is a schematic diagram illustrating a configuration of an ultrasonic inspection apparatus in the present modification, together with a part of an axial section of the pipe. Incidentally, in the present modification, parts equivalent to those of the one embodiment and the first modification described above are identified by the same reference characters, and description thereof will be omitted as appropriate. In the present modification, the pipe 1 is covered by a heat insulating material 4.

The ultrasonic inspection apparatus according to the present modification includes: an output coil 18 that is connected to the pulser 14 of the control device 12 via a cable, and whose disposition can be changed on the outer surface of the heat insulating material 4; an input coil 19 that is connected to the receiver 15 of the control device 12 via a cable, and whose disposition can be changed on the outer surface of the heat insulating material 4; and coils, not illustrated, respectively provided in the ultrasonic probes 11A to 11I.

The pulser 14 of the control device 12 outputs a pulse signal to the ultrasonic probe 11A by using an electromagnetic induction between the coil of the ultrasonic probe 11A and the output coil 18 that is disposed so as to face the coil of the ultrasonic probe 11A. The receiver 15 of the control device 12 is supplied with a waveform signal from any one of the ultrasonic probes 11B to 11I by using an electromagnetic induction between the coil of the one of the ultrasonic probes 11B to 11I and the input coil 19 that is disposed so as to face the coil.

The present modification can also provide effects similar to those of the one embodiment and the first modification described above.

Incidentally, in the first and second modifications, though not particularly described, the control device 12 may compute the thickness reduction depth of the pipe 1 at the position of the ultrasonic probe 11A by using the reception time of an ultrasonic wave transmitted from the ultrasonic probe 11A, reflected by the inner surface 3 of the pipe 1, and received by the ultrasonic probe 11A. In addition, it may compute the thickness reduction depth of the pipe 1 at the position of the ultrasonic probe 11B by using of the reception time of an ultrasonic wave transmitted from the ultrasonic probe 11B, reflected by the inner surface 3 of the pipe 1, and received by the ultrasonic probe 11B. In addition, it may compute the thickness reduction depth of the pipe 1 at the position of the ultrasonic probe 11C by using of the reception time of an ultrasonic wave transmitted from the ultrasonic probe 11C, reflected by the inner surface 3 of the pipe 1, and received by the ultrasonic probe 11C. In addition, it may compute the thickness reduction depth of the pipe 1 at the position of the ultrasonic probe 11D by using of the reception time of an ultrasonic wave transmitted from the ultrasonic probe 11D, reflected by the inner surface 3 of the pipe 1, and received by the ultrasonic probe 11D. In addition, it may compute the thickness reduction depth of the pipe 1 at the position of the ultrasonic probe 11E by using of the reception time of an ultrasonic wave transmitted from the ultrasonic probe 11E, reflected by the inner surface 3 of the pipe 1, and received by the ultrasonic probe 11E. In addition, it may compute the thickness reduction depth of the pipe 1 at the position of the ultrasonic probe 11F by using of the reception time of an ultrasonic wave transmitted from the ultrasonic probe 11F, reflected by the inner surface 3 of the pipe 1, and received by the ultrasonic probe 11F. In addition, it may compute the thickness reduction depth of the pipe 1 at the position of the ultrasonic probe 11G by using of the reception time of an ultrasonic wave transmitted from the ultrasonic probe 11G, reflected by the inner surface 3 of the pipe 1, and received by the ultrasonic probe 11G. In addition, it may compute the thickness reduction depth of the pipe 1 at the position of the ultrasonic probe 11H by using of the reception time of an ultrasonic wave transmitted from the ultrasonic probe 11H, reflected by the inner surface 3 of the pipe 1, and received by the ultrasonic probe 11H. In addition, it may compute the thickness reduction depth of the pipe 1 at the position of the ultrasonic probe 11I by using of the reception time of an ultrasonic wave transmitted from the ultrasonic probe 11I, reflected by the inner surface 3 of the pipe 1, and received by the ultrasonic probe 11I. It is thereby possible to increase measurement points of the pipe 1.

In addition, in the first and second modifications, though not particularly described, the signal processing unit 16 of the control device 12 may compute the thickness reduction depth of the pipe 1 between the ultrasonic probe 11A and the other ultrasonic probe (and at the position of each of the ultrasonic probes) at intervals of a predetermined time, for example, store a history thereof in the storage unit 17, and compute thickness reduction progress speed of the pipe 1 between the ultrasonic probe 11A and the other ultrasonic probe (and at the position of each of the ultrasonic probes) on the basis of the above-described history. The display device 13 may display the thickness reduction progress speeds of the pipe 1 which are computed by the control device 12.

Further, the control device 12 may compute a remaining life of the pipe 1 on the basis of the thickness reduction depth and the thickness reduction progress speed of the pipe 1 between the ultrasonic probe 11A and each of the ultrasonic probes 11B to 11I (and at the position of each of the ultrasonic probes 11A to 11I). Specifically, times until the thickness reduction depth of the pipe 1 between the ultrasonic probe 11A and each of the ultrasonic probes 11B to 11I (and at the position of each of the ultrasonic probes 11A to 11I) reaches a predetermined value may be computed, and the smallest of these times may be taken as the remaining life of the pipe 1. The display device 13 may display the remaining life of the pipe 1 which is computed by the control device 12.

DESCRIPTION OF REFERENCE CHARACTERS

1: Pipe (inspection object)
2: Outer surface

3: Inner surface
11A to 11I: Ultrasonic probe
12: Control device
13: Display device
18: Output coil
19: Input coil

What is claimed is:

1. An ultrasonic inspection apparatus comprising:
a first ultrasonic probe that is disposed on an outer surface of an inspection object, and transmits an ultrasonic wave to an inside of the inspection object;
a second ultrasonic probe that is disposed on the outer surface of the inspection object so as to be separated from the first ultrasonic probe, and receives the ultrasonic wave reflected by an inner surface of the inspection object;
a control device that is configured to output a pulse signal for making the first ultrasonic probe transmit the ultrasonic wave to the first ultrasonic probe, that is supplied with a waveform signal obtained by converting the received ultrasonic wave from the second ultrasonic probe, and that is configured to compute a thickness reduction depth of the inspection object between the first ultrasonic probe and the second ultrasonic probe; and
a display device that displays the thickness reduction depth of the inspection object computed by the control device, wherein
the control device is configured to
compute the thickness reduction depth of the inspection object between the first ultrasonic probe and the second ultrasonic probe by selectively using a reception time of the ultrasonic wave transmitted from the first ultrasonic probe, reflected once by the inner surface of the inspection object, and received by the second ultrasonic probe, and a reception time of the ultrasonic wave transmitted from the first ultrasonic probe, reflected twice by the inner surface of the inspection object, and received by the second ultrasonic probe.

2. The ultrasonic inspection apparatus according to claim 1, wherein
the control device is configured to
compute the thickness reduction depth of the inspection object between the first ultrasonic probe and the second ultrasonic probe by using the reception time of the ultrasonic wave transmitted from the first ultrasonic probe, reflected twice by the inner surface of the inspection object, and received by the second ultrasonic probe when a reception strength of the ultrasonic wave transmitted from the first ultrasonic probe, reflected twice by the inner surface of the inspection object, and received by the second ultrasonic probe is equal to or more than a predetermined threshold value, and
compute the thickness reduction depth of the inspection object between the first ultrasonic probe and the second ultrasonic probe by using the reception time of the ultrasonic wave transmitted from the first ultrasonic probe, reflected once by the inner surface of the inspection object, and received by the second ultrasonic probe when the reception strength of the ultrasonic wave transmitted from the first ultrasonic probe, reflected twice by the inner surface of the inspection object, and received by the second ultrasonic probe is less than the predetermined threshold value.

3. The ultrasonic inspection apparatus according to claim 1, wherein
the control device is configured to compute a thickness reduction progress speed of the inspection object between the first ultrasonic probe and the second ultrasonic probe on a basis of a history of the thickness reduction depth of the inspection object between the first ultrasonic probe and the second ultrasonic probe, and
the display device displays the thickness reduction progress speed of the inspection object computed by the control device.

4. The ultrasonic inspection apparatus according to claim 3, wherein
the control device is configured to compute a remaining life of the inspection object on a basis of the thickness reduction depth and the thickness reduction progress speed of the inspection object between the first ultrasonic probe and the second ultrasonic probe, and
the display device displays the remaining life of the inspection object computed by the control device.

5. The ultrasonic inspection apparatus according to claim 1, wherein
the first ultrasonic probe and the second ultrasonic probe are fixed to an outer surface of a pipe.

6. The ultrasonic inspection apparatus according to claim 1, wherein
the control device outputs the pulse signal to the first ultrasonic probe by using an electromagnetic induction between coils, and is supplied with the waveform signal from the second ultrasonic probe by using the electromagnetic induction between the coils.

7. An ultrasonic wave inspection method of transmitting an ultrasonic wave to an inside of an inspection object by a first ultrasonic probe disposed on an outer surface of the inspection object, and receiving the ultrasonic wave reflected by an inner surface of the inspection object by a second ultrasonic probe disposed on the outer surface of the inspection object so as to be separated from the first ultrasonic probe, the ultrasonic wave inspection method comprising:
by a control device, computing a thickness reduction depth of the inspection object between the first ultrasonic probe and the second ultrasonic probe by selectively using a reception time of the ultrasonic wave transmitted from the first ultrasonic probe, reflected once by the inner surface of the inspection object, and received by the second ultrasonic probe, and a reception time of the ultrasonic wave transmitted from the first ultrasonic probe, reflected twice by the inner surface of the inspection object, and received by the second ultrasonic probe; and
displaying the computed thickness reduction depth of the inspection object on a display device.

* * * * *